UNITED STATES PATENT OFFICE.

GEORGE ALBERT MARINER AND FOLSOM DORSETT, OF CHICAGO, ILL., ASSIGNORS TO THE UNITED STATES PIPE-PROTECTING COMPANY, OF SAME PLACE.

IMPROVEMENT IN COATINGS FOR IRON, &c.

Specification forming part of Letters Patent No. 118,032, dated August 15, 1871.

*To all whom it may concern:*

Be it known that we, GEORGE ALBERT MARINER and FOLSOM DORSETT, of Chicago, in the county of Cook and State of Illinois, have invented a new and Improved Protecting Coating for Metals and other substances; and we do hereby declare that the following is a full, clear, and exact description thereof.

This invention relates to an improved compound which is designed particularly as a coating or covering for metallic and other surfaces, to protect them from decay. It consists in the combination of oleaginous, resinous, and mineral or earthy substances, as will be hereinafter explained.

Under the head of oleaginous substances any animal, vegetable, or mineral oil may be employed, such, for instance, as linseed or cotton-seed oil, paraffine, lard, fish, or petroleum oil, or any suitable combination of two or more oils. The vegetable drying oils are preferred. Of the resinous or bituminous substances, resin or pitch or asphaltum may be used. Of the mineral substances, clay is preferred, either ordinary clay or clay in the hardest state as found in the slate-clay, or shales, or the bituminous shales, or burned bricks, properly reduced. Also, magnesian minerals, as soap-stone and the like.

We melt any fusible, resinous, or bituminous substance, resin, for example, in a suitable vessel, and add to this linseed or paraffine oil, and finely-divided soap-stone, clay, or other non-corrosive mineral substance in a dry state. The whole is then thoroughly incorporated by agitation.

The proportions of the above ingredients may be slightly varied, but we have produced the best results by adopting the following ingredients and relative proportions: Linseed or paraffine oil, two to four parts; resin, forty-six to forty-eight parts; clay or soap-stone, fifty parts. If clay and soap-stone are used in combination with each other, we use about twenty-five parts of each, aggregating fifty parts to the compound.

Articles may be coated with this compound by dipping or otherwise, and when sufficiently covered they may be passed under a sieve or over an inclined plane supplied with sand or other like substance, which will protect the surfaces and facilitate handling the articles.

The thickness of the coating may be regulated by an increase or diminution of the temperature of the melted mass at the time of applying the coating.

The resinous or bituminous substance gives to the mixture fusibility without causing it to soften under ordinary temperatures when in practical use. It also gives to the mixture the power to resist the action of water and acids. The oleaginous substances are used to prevent brittleness in the mass by imparting elasticity and toughness to it. The mineral substances give solidity, permanency, and indestructibility to the mass, and give to it as a coating the greatest possible power to resist oxidation or change of any kind.

Having explained our invention, we claim—

Oleaginous, resinous, and mineral substances, combined in about the proportions set forth.

GEORGE ALBERT MARINER.
FOLSOM DORSETT.

Witnesses:
D. J. CROCKER,
H. D. CROCKER.